United States Patent
Usui et al.

(10) Patent No.: US 11,416,722 B2
(45) Date of Patent: Aug. 16, 2022

(54) RECORDING CONTROL DEVICE, RECORDING DEVICE, AND RECORDING CONTROL METHOD

(71) Applicant: SEIKO EPSON CORPORATION, Tokyo (JP)

(72) Inventors: Masaya Usui, Nagano (JP); Naoki Sudo, Nagano (JP); Yasutoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/583,367

(22) Filed: Sep. 26, 2019

(65) Prior Publication Data

US 2020/0104661 A1   Apr. 2, 2020

(30) Foreign Application Priority Data

Sep. 28, 2018   (JP) .............................. JP2018-183519

(51) Int. Cl.
| | | |
|---|---|---|
| G06F 15/00 | (2006.01) | |
| G06K 15/02 | (2006.01) | |
| G06K 15/10 | (2006.01) | |
| G06K 15/00 | (2006.01) | |

(52) U.S. Cl.
CPC ....... *G06K 15/1871* (2013.01); *G06K 15/007* (2013.01); *G06K 15/102* (2013.01); *G06K 2215/101* (2013.01)

(58) Field of Classification Search
CPC ............. G06K 15/1871; G06K 15/007; G06K 15/102; G06K 2215/101
USPC ......................................................... 358/1.2
See application file for complete search history.

(56) References Cited

U.S. PATENT DOCUMENTS

| | | | |
|---|---|---|---|
| 2012/0242766 A1* | 9/2012 | Kondo .................. | B41J 11/002 347/102 |
| 2013/0194589 A1* | 8/2013 | Suzuki ............... | G06K 15/1871 358/1.2 |
| 2014/0218427 A1* | 8/2014 | Nishioka ................ | B41J 19/145 347/9 |

FOREIGN PATENT DOCUMENTS

| | | |
|---|---|---|
| JP | 2009-066831 A | 4/2009 |
| JP | 2011-046003 A | 3/2011 |

* cited by examiner

*Primary Examiner* — Mark R Milia
(74) *Attorney, Agent, or Firm* — Global IP Counselors, LLP

(57) ABSTRACT

A recording control device that controls a recording device that discharges a dot to perform recording includes an edge detection unit configured to detect an edge of an image represented by image data, and a recording control unit configured to generate dot data specifying the dot based on the image data and to cause the recording device to perform recording based on the dot data. The recording control unit causes an internal region, located on an inner side of an edge region including the edge of the image, to be recorded using a dot having a smaller size than that of a dot used for recording of the edge region, or to be dot-off.

9 Claims, 8 Drawing Sheets

RECORDING CONTROL DEVICE, RECORDING DEVICE, AND RECORDING CONTROL METHOD

The present application is based on and claims priority from JP Application Serial Number 2018-183519, filed Sep. 28, 2018, the disclosure of which is hereby incorporated by reference herein in its entirety.

BACKGROUND

1. Technical Field

The present disclosure relates to a recording control device, a recording device, and a recording control method.

2. Related Art

A printing apparatus is known in which drawing dots corresponding to an edge portion among drawing dots constituting a barcode image are set as second drawing dots having a smaller diameter than that of first drawing dots, among the first drawing dots and the second drawing dots, and the dots other than those corresponding to the edge portion are set as the first drawing dots, to print the barcode image (see JP-A-2009-66831).

Even when the edge portions are processed as in JP-A-2009-66831, the dots in the edge portions may bleed on a recording medium and spread to an outer side of the edges, degrading the quality of the barcode. Thus, there has been a demand for improvement of recording quality.

SUMMARY

A recording control device that controls a recording device that discharges a dot to perform recording includes an edge detection unit configured to detect an edge of an image represented by image data, and a recording control unit configured to generate dot data specifying the dot based on the image data and to cause the recording device to perform recording based on the dot data. The recording control unit is configured to cause an internal region, located on an inner side of an edge region including the edge, of the image to be recorded using a dot having a smaller size than that of a dot used for recording in the edge region, or to be dot-off.

DESCRIPTION OF EXEMPLARY EMBODIMENTS

Embodiments of the present disclosure will be described below with reference to the drawings. Note that each of the drawings is merely illustrative for description of the present embodiment.

1. BRIEF DESCRIPTION OF SYSTEM

Figure 1:
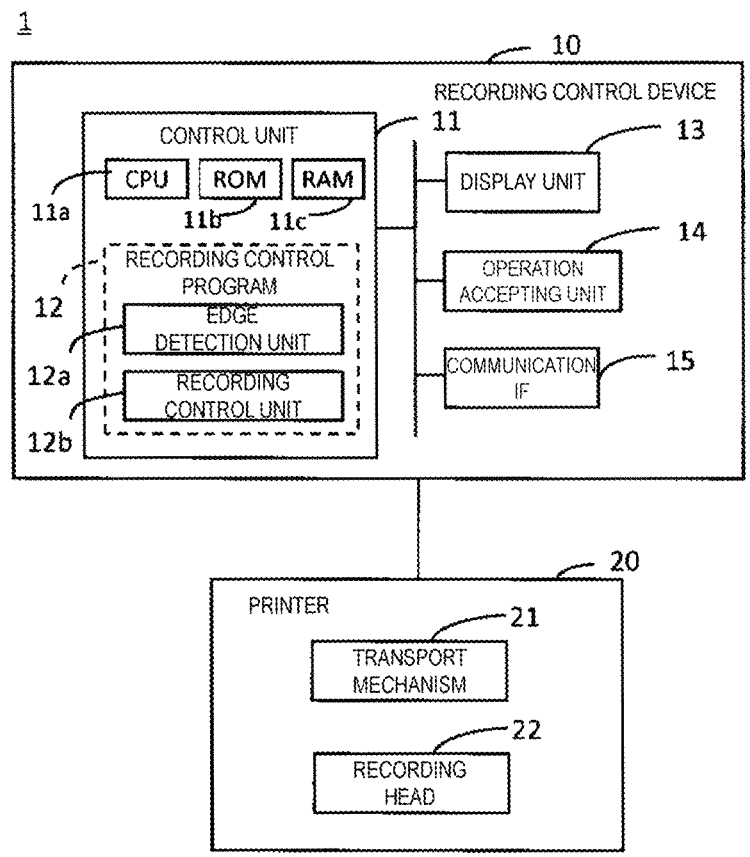
FIG. 1 is a diagram illustrating a schematic configuration of a system.

FIG. 1 illustrates, in a simplified manner, a configuration of a system 1 according to the present embodiment. The system 1 includes a recording control device 10 and a printer 20. The system 1 may be referred to as a recording system, an image processing system, a printing system, or the like.

The recording control device 10 is implemented by, for example, a personal computer, a smartphone, a tablet terminal, or an information processor having processing capabilities equivalent to those of the above-described devices. The recording control device 10 includes a control unit 11, a display unit 13, an operation accepting unit 14, a communication interface 15, and the like. The interface is abbreviated as IF. The control unit 11 is configured to include one or a plurality of ICs including a CPU 11a as a processor, a ROM 11b, a RAM 11c, and the like, a different non-volatile memory, and the like.

In the control unit 11, the processor, in other words, the CPU 11a executes arithmetic processing according to a program stored in the ROM 11b, the different memory, or the like, by using the RAM 11c or the like as a work area. The control unit 11, for example, executes processing according to a recording control program 12 implement a plurality of functions, such as the functions of an edge detection unit 12a and a recording control unit 12b, in cooperation with the recording control program 12. Note that the processor is not limited to a single CPU and that processing may be executed by a plurality of CPUs, a hardware circuit, such as an ASIC, or the like, or through cooperation of a CPU and a hardware circuit.

The display unit 13 is a unit for displaying visual information, and includes, for example, a liquid crystal display or an organic EL display. The display unit 13 may be configured to include a display and a drive circuit for driving the display. The operation accepting unit 14 is a unit for accepting an operation by a user, and is implemented using, for example, a physical button, a touch panel, a mouse, a keyboard, or the like. Of course, the touch panel may be implemented as a function of the display unit 13. A combination of the display unit 13 and the operation accepting unit 14 can be referred to as an operating panel of the recording control device 10.

The display unit 13 and the operation accepting unit 14 may be a part of the configuration of the recording control device 10, but may alternatively be a peripheral device external to the recording control device 10. The communication IF 15 is a generic term for one or a plurality of IFs used for the recording control device 10 to perform wired or wireless communication with the outside in compliance with a prescribed communication protocol including a known communication standard. The control unit 11 communicates with the printer 20 via the communication IF 15.

The printer 20 as a recording device controlled by the recording control device 10 is an ink-jet printer that discharges dots of ink to perform recording. The dots are also referred to as droplets. Although a detailed description of the ink-jet printer is omitted, the printer 20 generally includes a transport mechanism 21, a recording head 22, and the like. The transport mechanism 21 transports the recording medium along a prescribed transport direction. The recording medium is typically paper, but may be a material other than paper, for example, a film or the like. The recording head 22 includes a plurality of nozzles (not illustrated) capable of discharging dots. The recording head 22 discharges dots from each nozzle onto a recording medium transported by the transport mechanism 21.

The printer 20 performs recording by discharging color inks, for example, cyan (C) ink, magenta (M) ink, yellow (Y) ink, and black (K) ink, or inks or liquids in colors other than these colors. The printer 20 may be a serial printer in which recording is performed by a recording head 22 mounted on a carriage reciprocating in directions intersecting the transport direction, or may be a line printer in which recording is performed by a fixed recording head 22 that is long in the directions intersecting the transport direction.

As is known, the nozzles provided in the recording head 22 can discharge a plurality of types of dots having different sizes. The different dot sizes mean that a defined liquid volume per dot varies. The printer 20 controls a drive signal provided to driving elements included in each of the nozzles according to dot data described below, to thereby be able to vary the size of dots to be discharged from the nozzles.

The recording control device 10 and the printer 20 may be connected through a network (not illustrated). The printer 20 may be a multifunction machine providing a plurality of functions including functions of a scanner and a facsimile communication function in addition to a printing function. The recording control device 10 may be implemented not only by one independent information processing device but also by a plurality of information processing devices communicatively connected to each other via a network.

Alternatively, the recording control device 10 and the printer 20 may be an integral device. In other words, the recording control device 10 may be interpreted to be a part of a configuration included in the printer 20, serving as a recording device, and processing executed by the recording control device 10 described below may be interpreted as processing executed by the printer 20.

2. RECORDING CONTROL PROCESSING

The inventors focus on a phenomenon in which a manner of bleeding of dots corresponding to edges on a recording medium varies according to a relationship between dots corresponding to edges in an image and dots printed on an inner side of the dots corresponding to the edges. Specifically, the inventors have found that an increasing amount of ink used for recording on the inner side of the image with respect to that for the dots corresponding to the edges makes the dots corresponding to the edges more likely to bleed and spread to an outer side of the edges. In contrast, a decreasing amount of ink used for recording on the inner side of the image with respect to that for the dots corresponding to the edges makes the dots corresponding to the edges less likely to spread to the outer side of the edges.

Based on such findings, the present embodiment suppresses degradation of recording quality due to bleeding of the edges in the image recorded on the recording medium.

Figure 2:
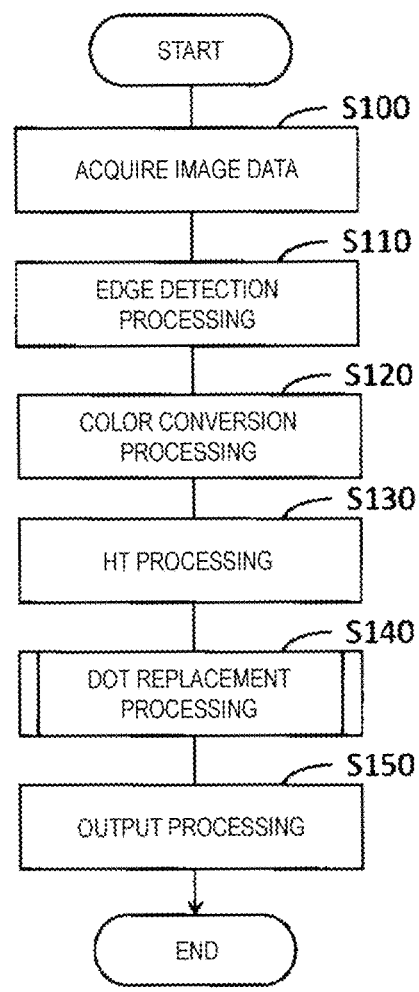
FIG. 2 is a flowchart illustrating recording control processing.

FIG. 2 illustrates, in a flowchart, recording control processing achieved by the control unit 11 in accordance with the recording control program 12. At least some of the steps illustrated in FIG. 2 indicate steps of the recording control method.

In step S100, the control unit 11 acquires image data representing an image. The image is a kind of object to be printed on a recording medium by the printer 20, and is, for example, a barcode as is the case of JP-A-2009-66831. Of course, the image represented by the image data may be a letter, CG, a photograph, or the like. For example, the image data is selected by the user operating the operation accepting unit 14. The control unit 11 acquires the selected image data from a storage source. The storage source of the image data may be any of various storages, such as a storage medium built in the recording control device 10 or an external storage medium with which the recording control device 10 can communicate.

The image data acquired in step S100 is, as an example, RGB data in a bitmap format in which each pixel has a gray scale value for each of red (R), green (G), and blue (B) (e.g., gray scale values expressed by 256 levels of gray ranging from 0 to 255). When, for example, the image data acquired in step S100 is not in the RGB data format, the control unit 11 may execute format conversion processing or resolution conversion processing as necessary on the image data acquired in step S100, and process RGB data resulting from such conversion processing in steps succeeding step S110.

In step S110, the control unit 11 functions as the edge detection unit 12a that executes edge detection processing. Based on the image data passed from step S100, the edge detection unit 12a detects edges in the image represented by the image data. In this case, the edge detection unit 12a detects pixels corresponding to the edges in the image, in other words, edge pixels. The edge pixels are generally pixels for which the amount of change in color in comparison with that of adjacent pixels is equal to or larger than a prescribed reference. The method for detecting the edge pixels is not particularly limited, and various detection methods can be employed including known techniques. The edge detection unit 12a, for example, applies a filter, such as a Laplacian filter, a Sobel filter, or the like, to the image data to thereby detect the edge pixels. The edge detection unit 12a stores, in a prescribed memory, the position, in the image data, of each of the edge pixels detected through the edge detection processing.

In step S120, the control unit 11 performs color conversion processing on the image data. The color conversion processing is processing for converting the image data to be processed into data of a color system for inks used by the printer 20. For example, the control unit 11 is capable of executing the color conversion processing with reference to a color conversion lookup table in which RGB gray scale values are associated with CMYK gray scale values. The image data resulting from the color conversion processing is CMYK data in a bitmap format in which each pixel has CMYK gray scale values (e.g., gray scale values expressed by 256 levels of gray ranging from 0 to 255).

Note that a timing for the edge detection processing is not limited to the timing of step S110 illustrated in FIG. 2. For example, the control unit 11 may execute the edge detection processing based on the image data resulting from the color conversion processing.

In steps S130 to S150, the control unit 11 functions as a recording control unit 12b. In step S130, the recording control unit 12b executes halftone processing on the image data resulting from the color converting processing to generate dot data defining dots. The halftone processing is abbreviated as the HT processing. The HT processing, for example, converts data indicating 256 levels of gray into 1-bit data indicating two levels of gray or 2-bit data indicating four levels of gray. The HT processing can be executed using dithering, gamma correction, error diffusion, or the like. The dot data resulting from the HT processing is data of each ink color, and defines presence or absence (dot-on or dot-off recording) of a dot for each pixel and a dot size.

As an example, the recording head 22 is assumed to be capable of discharging three types of dots having different sizes from the nozzles. The three types of dots with different sizes are referred to as large dots, medium dots, and small dots in an order of decreasing size. Thus, the dot data of each ink color is data specifying one of large-dot-on recording, medium-dot-on recording, small-dot-on recording, and dot-off recording for each pixel.

In step S140, the recording control unit 12b executes dot replacement processing on the dot data generated in step S130. The dot replacement processing is processing for replacing dots in an internal region located on an inner side of an edge region including the edges in the image to replace dots of the internal region with dots having a smaller size than that of dots used to record the dots in the edge region. Details of step S140 will be described below with reference to FIGS. 3 to 8.

In step S150, the recording control unit 12b executes output processing on the dot data resulting from the dot replacement processing to cause the printer 20 to perform recording based on the dot data resulting from the dot replacement processing. In this case, the recording control unit 12b rearranges pixels arranged in a matrix and constituting the dot data resulting from the dot replacement processing, in a prescribed order of data according to the recording method employed by the printer 20. Such rearrangement is also referred to as rasterization processing. The recording method used herein refers to, for example, a method based on a combination of various conditions such as whether unidirectional recording or bi-directional recording is performed by the recording head 22 reciprocating along with the carriage, whether so-called overlapping printing is to be performed, and the amount by which the recording medium is fed between scans by the recording head 22. Depending on the recording method, the order in which pixel data is to be assigned to which nozzle is determined.

The recording control unit 12b sequentially outputs rasterized dot data to the printer 20 via the communication IF 15. Based on the dot data thus output, the printer 20 discharges the ink from each nozzle of the recording head 22. As a result, an image represented by the image data acquired in step S100 is recorded on the recording medium.

Details of step S140 will be described.

Figure 3:
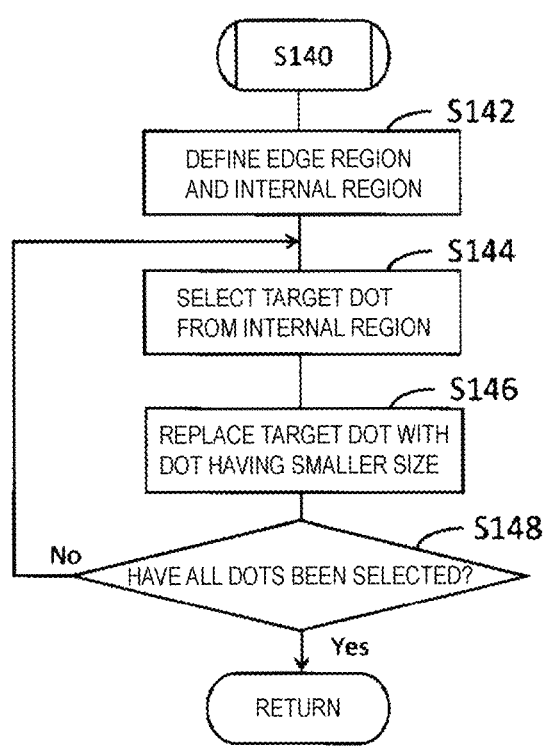
FIG. 3 is a flowchart illustrating step S140.

FIG. 3 illustrates step S140 in a flowchart. FIG. 3 illustrates the dot replacement processing for dot data of one color among pieces of dot data of respective ink colors, in this case, pieces of dot data of respective CMYK. The recording control unit 12b executes the dot replacement processing on each of the pieces of dot data of respective ink colors.

In step S142, the recording control unit 12b defines, within the dot data, an edge region and an internal region located on an inner side of the edge region. First, the recording control unit 12b specifies, as the edge region, a pixel row in which the edge pixels detected by the edge detection processing described above are contiguous to one another. The pixel row in the present embodiment refers to a region in which a plurality of pixels are arranged. The pixels of the pixel row may be arranged in any of a vertical direction, a horizontal direction, and an oblique direction, and the direction in which the pixels of the pixel row are arranged may be curved. In other words, the recording control unit 12b specifies, as the edge region, a region in which the edge pixels arranged on the edges along the edges in the image represented by the image data are contiguous to one another. The recording control unit 12b specifies, as an internal region, a pixel row in which pixels adjacent to the edge region on the inner side of the image are contiguous to one another.

Figure 4:
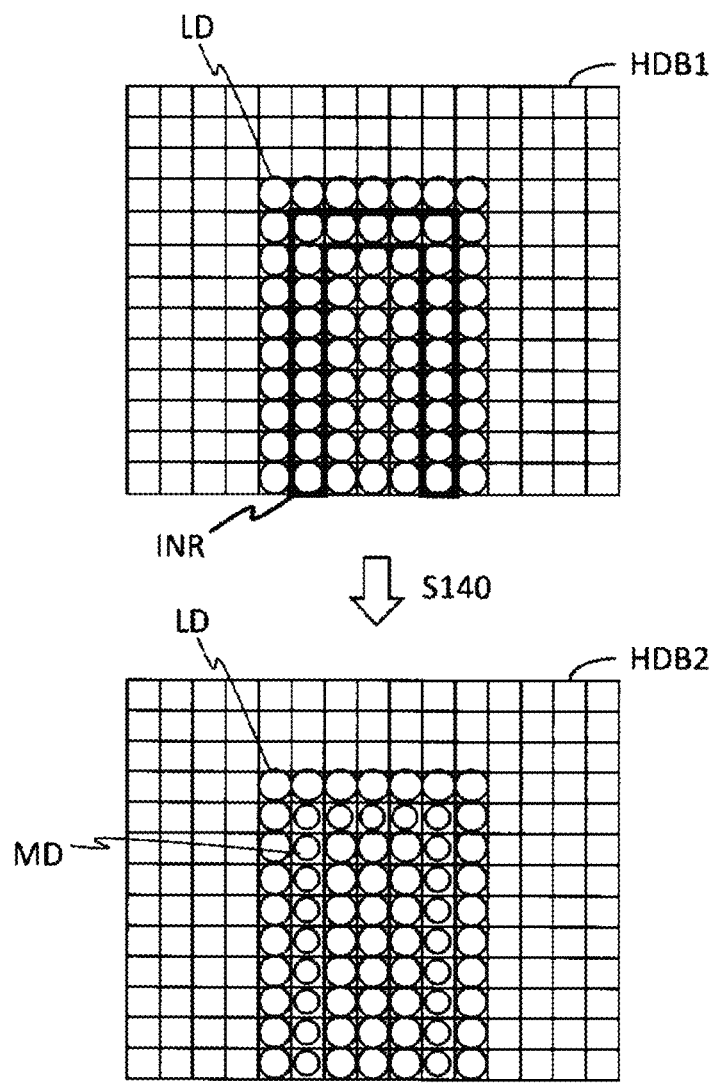
FIG. 4 is a diagram illustrating First Example of dot replacement processing.

FIG. 4 is a diagram illustrating First Example of the dot replacement processing in step S140. Reference sign HDB1 in an upper stage of FIG. 4 denotes a part of the dot data generated through the HT processing in step S130 and defines the dots of K ink. Individual rectangles in the dot data HDB1 indicate the pixels constituting the dot data HDB1. Additionally, circles drawn correspondingly to some pixels of the dot data HDB1 represent dots. In other words, in the dot data HDB1, a pixel with a circle drawn therein is a pixel specified for dot-on recording with K ink, and a pixel with no circle drawn therein is a pixel specified for dot-off recording with K ink.

In the example in FIG. 4, the dot data HDB1 represents a part of a bar of a barcode as an image, and the dots in the pixels specified for dot-on recording to represent the bar are all large dots LD. In the dot data HDB1, a region enclosed by thick lines is an internal region INR. The edge region is a region where pixels adjacent, on an outer side of the image, to the internal region INR are contiguous to one another.

In step S144, the recording control unit 12b selects, from the internal region defined in step S142, one target dot on which processing in step S146 is to be executed. In this case, the recording control unit 12b selects, as a target dot, a dot defined for any one of the pixels constituting the internal region.

In step S146, the recording control unit 12b replaces the target dot with a dot having a smaller size than that of the dots in the edge region. In the example in FIG. 4, the dots defined in both the edge region and the internal region INR in the dot data HDB1 are large dots LD. Thus, the recording control unit 12b replaces the target dot, which is a large dot LD with a middle dot MD, for example.

In step S148, the recording control unit 12b determines whether all of the dots defined for the pixels constituting the internal region defined in step S142 have been selected in step S144. When all of the dots in the internal region have been selected as target dots, the recording control unit 12b determines "Yes" and ends step S140. On the other hand, when some of the dots in the internal region have yet to be selected, the recording control unit 12b determines "No" and proceeds to step S144. In step S144, to which the processing has proceeded from step S148, the recording control unit 12b selects one of the dots that have yet to be selected in the internal region as a target dot, and proceeds to step S146.

The reference sign HDB2 in a lower portion of FIG. 4 indicates dot data resulting from execution of the dot replacement processing on the dot data HDB1. A comparison between the dot data HDB2 and the dot data HDB1 indicates that the large dots LD defined for the pixels constituting the internal region INR in the dot data HDB1 have been replaced with medium dots MD. In the output processing in step S150, the recording control unit 12b causes the printer 20 to perform recording based on such dot data HDB2. Thus, dots having a smaller size than the dots used to record the edge region are used to record the internal region located on the inner side of the edge region in the image represented by the image data.

A method for defining the edge region and the internal region in step S142 is not limited to the method described above.

Figure 5:
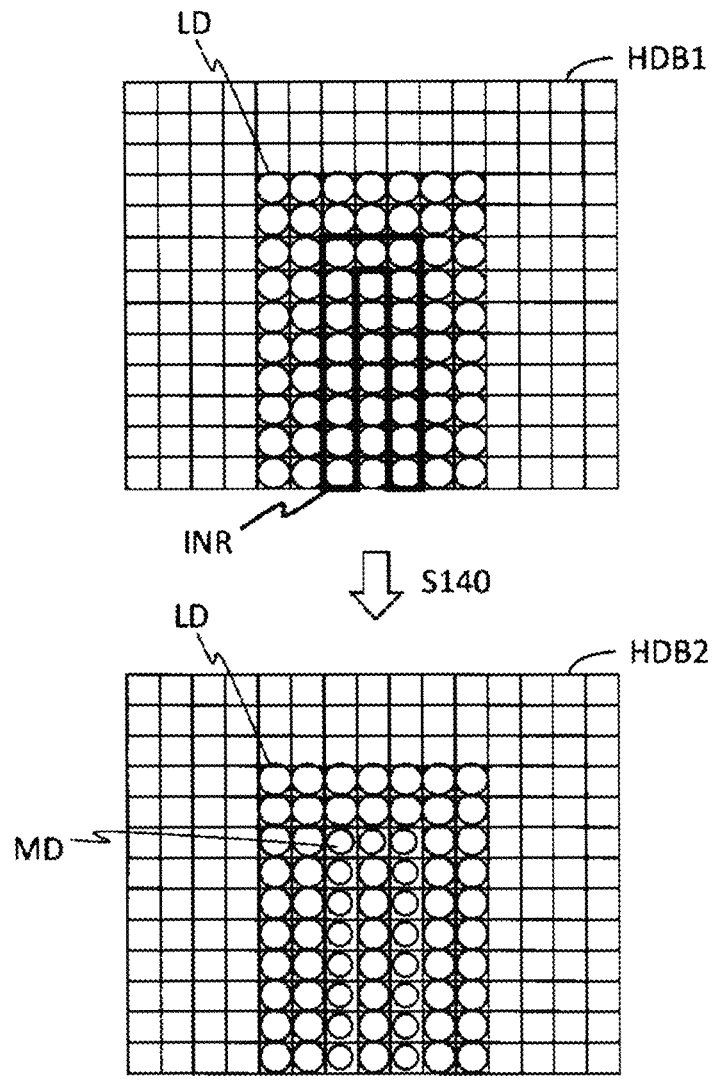
FIG. 5 is a diagram illustrating Second Example of the dot replacement processing.

FIG. 5 is a diagram illustrating Second Example of the dot replacement processing.

Figure 6:
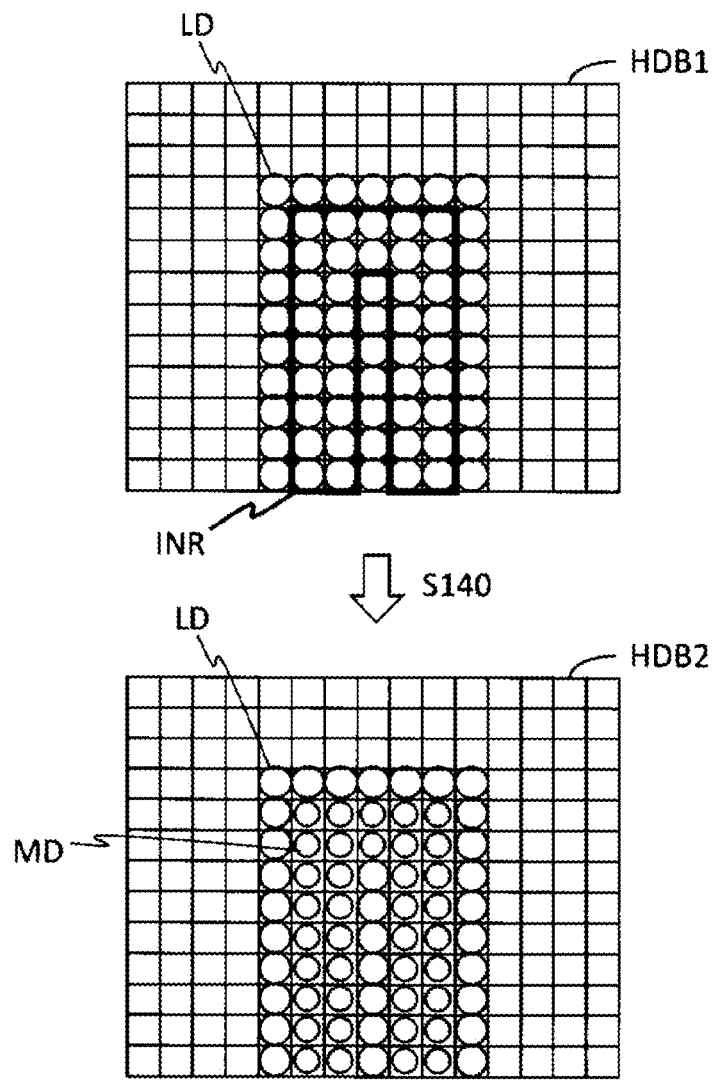
FIG. 6 is a diagram illustrating Third Example of the dot replacement processing.

FIG. 6 is a diagram illustrating Third Example of the dot replacement processing.

Each of the examples in FIGS. 5 and 6 differs from the example in FIG. 4 in the definition of the edge region and the internal region. The interpretation of the figures and the meanings of the signs are common to all in FIGS. 4 to 6.

In the example illustrated in FIG. 5, the recording control unit 12b specifies, as an edge region, a region corresponding to a combination of a pixel row in which the edge pixels are contiguous to one another and a pixel row in which pixels adjacent on the inner side of the image to the edge pixels are contiguous to one another in the dot data HDB1. The recording control unit 12b specifies, as the internal region INR, a pixel row in which pixels adjacent on the inner side of the image to such an edge region are contiguous to one another.

In the example illustrated in FIG. 6, the recording control unit 12b specifies, as an edge region, a pixel row in which the edge pixels are contiguous to one another in the dot data HDB1 as is the case of the example illustrated in FIG. 4. Meanwhile, the recording control unit 12b specifies, as the internal region INR, a region corresponding to a combination of a pixel row in which pixels adjacent on the inner side of the image to the edge region are contiguous to one another and a pixel row in which pixels adjacent on the inner side of the image to the pixels adjacent to the edge region on the inner side of the image are contiguous to one another.

More specifically, in First Example illustrated in FIG. 4, the recording control unit 12b specifies, as an edge region, one pixel row on an edge side of the image represented by a set of dots, and specifies one pixel row on the inner side of the edge region as an internal region. In contrast, in Second Example illustrated in FIG. 5, the recording control unit 12b specifies, as an edge region, two pixel rows on the edge side in the image represented by a set of dots, and specifies one pixel row on the inner side of the edge region as an internal region. Additionally, in Third Example illustrated in FIG. 6, the recording control unit 12b specifies, as an edge region, one pixel row on the edge side in the image represented by dots, and specifies two pixel rows on the inner side in the edge region as an internal region.

In both of the examples in FIGS. 5 and 6, as a result of the dot replacement processing, large dots LD defined for the pixels constituting the internal region INR in the dot data HDB1 are replaced with medium dots MD.

FIGS. 4 to 6 illustrate examples in which all the dots in the internal region are replaced with dots having a smaller size than that of all the dots in the edge region. However, the present embodiment is not limited to these examples. For example, the dot replacement processing may be processing in which the dots in the internal region are replaced with dots having a smaller size than that of some of the dots in the edge region.

Figure 7:
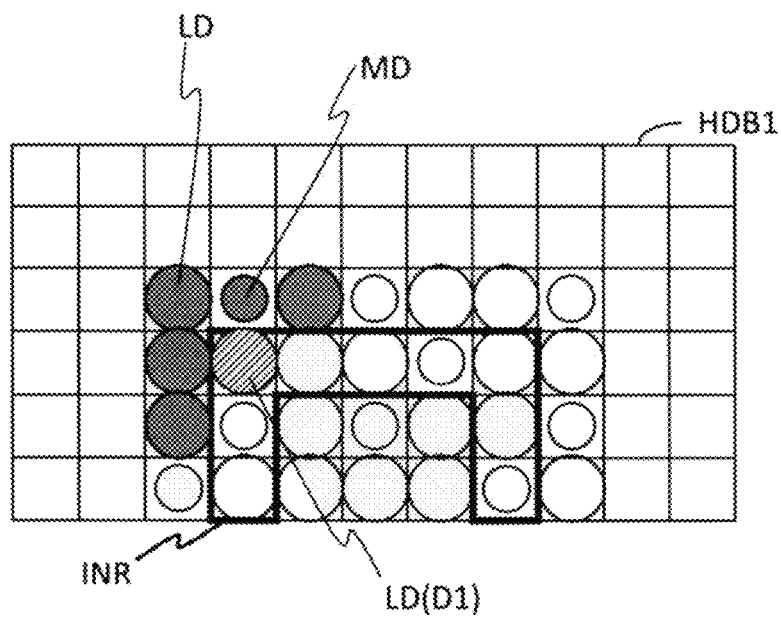
FIG. 7 illustrates a part of dot data before the dot replacement processing.

FIG. 7 illustrates a part of the dot data HDB1 in an enlarged and easy-to-see manner compared to FIGS. 4 to 6. In FIG. 7 as well, the interpretation of the figures and the meanings of the signs are the same as the interpretation and the meanings in FIGS. 4 to 6. However, FIG. 7 differs from FIGS. 4 to 6 in that not all the dots defined for the pixels in the dot data HDB1 have the large dot LD size. Depending on the density of the image represented by the image data and the specific technique for the HT processing executed in step S130, even the dots for pixels specified for dot-on recording to represent a bar code in the dot data HDB1 do not necessarily have the large dot LD size and are assumed to have a medium dot MD size or a dot size smaller than the medium dot MD size in some cases.

Accordingly, on the assumption of a case in which the sizes of the dots in the edge region and the internal region are not uniform at the time when dot data is generated through the HT processing, an example of dot replacement processing will be described with reference to FIG. 7. Note that, for the manner of defining the edge region and the internal region, the description of FIGS. 4 to 6 is referenced. In FIG. 7, one hatched large dot LD in the internal region INR is assumed to be a target dot D1 selected in step S144. The hatching and gray color applied to some of the dots illustrated as circles in the dot data HDB1 in FIG. 7 are only decoration for identification of the dots, and each circle in the dot data HDB1 corresponds to a dot of K ink. In FIG. 7, grayed dots adjacent to the target dot D1 in any of the vertical direction, the horizontal direction, and the oblique direction are dots defined for pixels adjacent to the target dot D1 among the pixels constituting the edge region. Each of the grayed dots is referred to as an adjacent edge dot for convenience of the description of FIG. 7.

In step S146, the recording control unit 12b may change the size of the dots in the pixels constituting the internal region to a size smaller than the size of a dot in at least one pixel adjacent to the pixels constituting the internal region among the pixels constituting the edge region. Compared to the plurality of adjacent edge dots, the target dot D1 is a large dot LD, and the plurality of adjacent edge dots include large dots LD and medium dots MD. In this case, the recording control unit 12b may replace the target dot D1 with a middle dot MD in step S146. Accordingly, the size of the target dot D1 is replaced with a size smaller than the size of at least one of the dots (adjacent edge dots) adjacent to the target dot D1 among the pixels constituting the edge region. Note that the replacement in step S146 is unnecessary when the target dot D1 has a size smaller than the size of at least one of the dots (adjacent edge dots) adjacent to the target dot D1 among the pixels constituting the edge region, as in the case in which the target dot D1 is, for example, a medium dot MD at the time when the target dot D1 is selected in step S144.

When the target dot D1 is a large dot LD and the plurality of adjacent edge dots are, for example, medium dots MD and small dots, the recording control unit 12b replaces the target dot D1 with a small dot in step S146.

Alternatively, the recording control unit 12b may replace, in step S146, the target dot D1 with a dot having a size smaller than all of the dots (adjacent edge dots) adjacent to the target dot D1 among the pixels constituting the edge region. When the plurality of adjacent edge dots are all small dots, the recording control unit 12b may change, in step S146, the target dot D1 to be dot-off.

Note that, as illustrated in FIG. 6, when the internal region INR includes a plurality of pixel rows, the target dot selected in step S144 is possibly originally not adjacent to the edge region. Thus, when the target dot selected in step S144 is a dot in a pixel not adjacent to the edge region, the recording control unit 12b may replace the target dot with a dot having the same size as that of a dot resulting from the replacement already performed in step S146 on any one pixel included in the other pixels adjacent to the target dot in the internal region.

3. CONCLUSION

As described above, according to the present embodiment, the recording control device 10 that controls the printer 20 that discharges dots to perform recording includes the edge detecting unit 12a configured to detect edges in an image represented by image data, and the recording control unit 12b configured to generate dot data specifying the dots based on the image data and to cause the printer 20 to perform recording based on the dot data. The recording control unit 12b causes an internal region on an inner side of an edge region including the edges in the image to be recorded using dots having a smaller size than that of dots used for recording in the edge region.

According to the above-described configuration, the printer 20 performs recording on an internal region located on the inner side of the edge region in the image represented by the image data, by using dots having a size smaller than that of the dots used to record the edge regions. This allows suppression of degradation of recording quality such as staggering of edges in an image on a recording medium resulting from dots corresponding to the edges bleeding and spreading to the outer side of the edges.

In addition, according to an aspect of the present embodiment, the recording control unit 12b generates, in step S140, the dot data in which dots in pixels constituting the internal region each have a smaller size than that of a dot in at least one pixel adjacent to the internal pixels among the pixels constituting the edge region.

According to the above-described configuration, the recording control unit 12b can compare the dots in the internal region with some of the dots in the edge region and easily replace the dots in the internal region with dots with a smaller size, and thus effectively suppressing degradation of the recording quality.

In addition, according to an aspect of the present embodiment, the edge region is a region in which pixels arranged on the edges are contiguous to one another, and the internal region is a region in which pixels adjacent on the inner side of the image to the edge region are contiguous to one another.

According to the above-described configuration, bleeding to the outer side of the edges and a reduced image density in recording results can be suppressed in a well-balanced manner.

Additionally, according to an aspect of the present embodiment, the edge region is a region including pixels arranged on the edges and pixels adjacent on the inner side of the image to the pixels arranged on the edges, and the internal region is a region in which pixels adjacent on the inner side of the image to the edge region are contiguous to one another.

According to the above-described configuration, a relatively narrow internal region is provided, and thus allowing advantageous effects of suppression of bleeding to the outer side of the edges in the recording results, while more appropriately suppressing a reduction in image density in the recording results.

According to an aspect of the present embodiment, the edge region is a region in which pixels arranged on the edges are contiguous to one another, and the internal region is a region including pixels adjacent, on the inner side of the image, to the edge region and pixels adjacent, on the inner side of the image, to the pixels adjacent, on the inner side of the image, to the edge region.

According to the above-described configuration, a relatively wide internal region is provided, thus allowing more proper suppression of bleeding to the outer side of the edges in the recording results.

4. OTHER EMBODIMENTS

As described using FIGS. 4 to 6 as examples, various manners are available for defining the edge region and the internal region. Here, a first definition mode refers to a mode in which the edge region is a region where pixels arranged on the edges in the image, in other words, the edge pixels, are contiguous to one another and in which the internal region is a region where pixels adjacent, on the inner side of the image, to the edge region are contiguous to one another, as described using FIG. 4 as an example.

Additionally, a second definition mode refers to a mode in which the edge region is a region including the edge pixels and the pixels adjacent, on the inner side of the image, to the edge region and in which the internal region is a region where the pixels adjacent, on the inner side of the image, to the edge region are contiguous to one another, as described using FIG. 5 as an example.

In addition, a third definition mode refers to a mode in which the edge region is a region in which the edge pixels are contiguous to one another and in which the internal region is a region including the pixels adjacent, on the inner side of the image, to the edge region and pixels adjacent, on the inner side of the image, to the pixels adjacent, on the inner side of the image, to the edge region, as described using FIG. 6 as an example.

The third definition mode is a mode in which a relatively wide internal region is likely to be provided among the first to third definition modes, and thus more effectively suppressing the spread of the dots in the edge region to the outer side of the edges. In contrast, the second definition mode is a mode in which a relatively narrow internal region is likely to be provided among the first to third definition modes, thus more effectively suppressing degradation of color reproducibility for the image represented by the image data, in other words, suppressing a reduction in image density in the recording results. The first definition mode produces a substantially intermediate effect between the effects of the second definition mode and the third definition mode. The recording control device 10 may employ one of the first to third definition modes in a switchable manner according to characteristics of the recording medium used by the printer 20 for recording.

Figure 8:
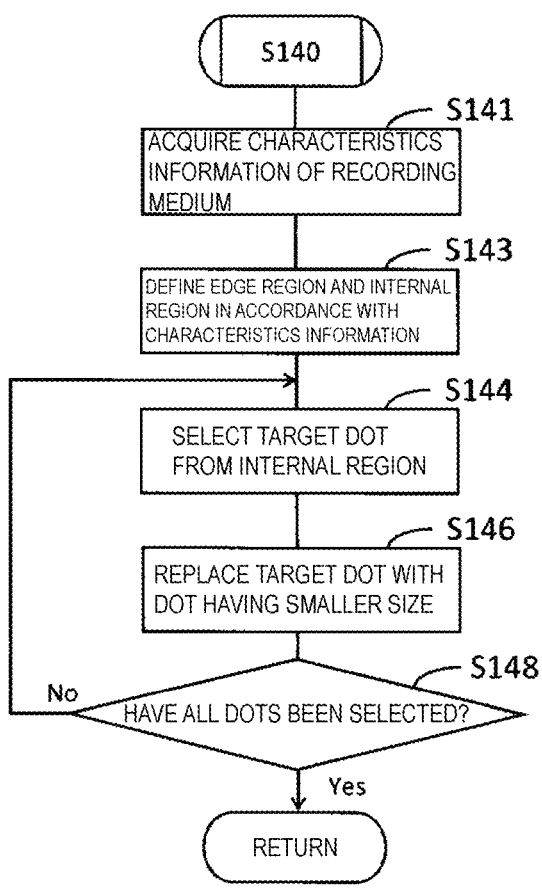
FIG. 8 is a flowchart illustrating step S140 according to a modified example.

FIG. 8 illustrates, in a flowchart, step S140 according to a modified example.

In step S141, the control unit 11 acquires characteristics information of the recording medium used by the printer 20 for recording. The characteristics information as used herein refers to information directly or indirectly indicating the likelihood of bleeding of the dots on the recording medium. For example, the recording control unit 12b communicates with the printer 20 via communication IF 15, and inquires about the type of the recording medium installed in the printer 20. The control unit 11 acquires the type of the recording medium by receiving a response to the inquiry from the printer 20. The type of recording medium is, for example, information such as plain paper, gloss paper, or the like, and is a type of information indicating the likelihood of bleeding of the dots. The plain paper is more susceptible to ink bleeding than the gloss paper.

Alternatively, the control unit 11 causes the display unit 13 to display a user interface screen for a user to input the likelihood of bleeding of dots on the recording medium used by the printer 20. The control unit 11 may then accept, from the user through the user interface screen, an input of an indicator or a numerical value indicating the likelihood of bleeding of dots on the recording medium. Note that step S141 is not the only timing at which the control unit 11 acquires the characteristics information of the recording medium used by the printer 20 for recording. The control unit 11 may acquire the characteristics information using any means before executing step S143.

In step S143, the recording control unit 12*b* selects any one of the first to third definition modes according to the characteristics information, that is, the likelihood of bleeding of dots on the recording medium, and employs the selected definition mode to define the edge region and the internal region within the dot data. The recording control unit 12*b* may select, for example, the third definition mode when which the characteristics information indicates that the likelihood of bleeding of the dots is higher than a prescribed reference for the likelihood. Additionally, the recording control unit 12*b* may select the second definition mode when the characteristics information indicates that the likelihood of bleeding is lower than the prescribed reference. Additionally, the recording control unit 12*b* may select the first definition mode when neither of the second and third definition modes is selected.

Steps S144, S146, and S148 executed after step S143 have already been described.

As described above, the recording control unit 12*b* determines the edge region and the internal region in accordance with the likelihood of bleeding of dots on the recording medium on which recording is performed by the printer 20. According to such a configuration, the recording control device 10 can appropriately define the edge region and the internal region in accordance with the likelihood of bleeding of dots on the recording medium, obtaining high-quality recording results on various recording media. In other words, when a recording medium is employed on which dots are likely to bleed, the third definition mode is employed to properly suppress the spread of the dots in the edge region to the outer side of the edges. Additionally, when a recording medium is employed on which dots are less likely to bleed, it is acceptable to have a somewhat low effect of suppressing the spread of dots in the edge region to the outer side of the edges. Thus, the second definition mode is employed to properly suppress a reduction in image density in the recording results.

In the above description, the recording control unit 12*b* causes the internal region located on the inner side of the edge region including the edges in the image to be subjected to recording using dots having a smaller size than that of the dots used for recording for the edge region. However, the present embodiment is not limited to this configuration, and a similar effect can be obtained by causing the internal region located on the inner side of the edge region including the edges in the image to be dot-off. Specifically, the recording control unit 12*b* may convert target dots into dot-off in step S146 in FIG. 3 or FIG. 8.

What is claimed is:

1. A recording control device that controls a recording device that discharges a dot to perform recording, the recording control device comprising:
   a processor configured to detect an edge of an image represented by image data,
   the processor being further configured to generate dot data of the image that specifies dot size of each pixel of the image based on the image data and to cause the recording device to perform recording of the image based on the dot data of the image, wherein
   while generating the dot data of the image, the processor is configured to
   compare, for each pixel of an internal region of the image, dot size of a pixel of the internal region with dot size of at least part of pixels of an edge region of the image, and
   replace the dot size of the pixel of the internal region based on the comparison result such that the pixel of the internal region is recorded using a dot having a smaller size than that of a dot used for recording the at least part of the pixels of the edge region, or is dot-off, the internal region being located on an inner side of the edge region, the edge region including the edge of the image, and
   the processor is configured to change the edge region and the internal region in accordance with a type of a recording medium on which recording is performed by the recording device.

2. The recording control device according to claim 1, wherein
   the processor is configured to generate the dot data in which a dot in a pixel included in the internal region has a smaller size than that of a dot in at least one pixel adjacent to the pixel included in the internal region among pixels included in the edge region, or is dot-off.

3. The recording control device according to claim 1, wherein
   the edge region is a region in which pixels arranged on the edge are contiguous to one another and
   the internal region is a region in which pixels adjacent, on an inner side of the image, to the edge region are contiguous to one another.

4. The recording control device according to claim 1, wherein
   the edge region is a region including pixels arranged on the edge and pixels adjacent, on an inner side of the image, to the pixels arranged on the edge and
   the internal region is a region in which pixels adjacent, on the inner side of the image, to the edge region are contiguous to one another.

5. The recording control device according to claim 1, wherein
   the edge region is a region in which pixels arranged on the edge are contiguous to one another, and
   the internal region is a region including
   a pixel adjacent, on an inner side of the image, to the edge region and
   a pixel adjacent, on the inner side of the image, to the pixel adjacent, on the inner side of the image, to the edge region.

6. The recording control device according to claim 1, wherein
   while generating the dot data of the image, the processor is further configured to
   compare, for each pixel of the internal region of the image, the dot size of the pixel of the internal region with dot size of an adjacent pixel of the edge region of the image, the adjacent pixel of the edge region being adjacent to the pixel of the internal region, and
   replace the dot size of the pixel of the internal region based on the dot size of the adjacent pixel of the edge region such that the pixel of the internal region is recorded using a dot having a smaller size than that of a dot used for recording the adjacent pixel of the edge region, or is dot-off.

7. The recording control device according to claim 1, wherein
the processor is configured to replace the dot size of the pixel of the internal region while keeping a size of the dot used for recording the at least part of the pixels of the edge region unchanged.

8. A recording device that discharges a dot to perform recording, the recording device comprising:
a processor configured to detect an edge of an image represented by image data,
the processor being further configured to generate dot data of the image that specifies dot size of each pixel of the image based on the image data and to perform recording of the image based on the dot data of the image, wherein
while generating the dot data of the image, the processor is configured to
compare, for each pixel of an internal region of the image, dot size of a pixel of the internal region with size data of at least part of pixels of an edge region of the image, and
replace the dot size of the pixel of the internal region based on the comparison result such that the pixel of the internal region is recorded using a dot having a smaller size than that of a dot used for recording the at least part of the pixels of the edge region, or is dot-off, the internal region being located on an inner side of the edge region, the edge region including the edge of the image, and
the processor is configured to change the edge region and the internal region in accordance with a type of a recording medium on which recording is performed by the recording device.

9. A recording control method for controlling a recording device that discharges a dot to perform recording, the recording control method comprising:
detecting an edge of an image represented by image data; and
generating dot data of the image that specifies dot size of each pixel of the image based on the image data and causing the recording device to perform recording of the image based on the dot data of the image, wherein
while generating the dot data of the image, for each pixel of an internal region of the image, dot size of a pixel of the internal region is compared with dot size of at least part of pixels of an edge region of the image, and the dot size of the pixel of the internal region is replaced based on the comparison result such that the pixel of the internal region is recorded using a dot having a smaller size than that of a dot used for recording the at least part of the pixels of the edge region, or is dot-off, the internal region being located on an inner side of the edge region, the edge region including the edge of the image, and
the edge region and the internal region are changed in accordance with a type of a recording medium on which recording is performed by the recording device.

* * * * *